US011475880B2

(12) United States Patent
Chang et al.

(10) Patent No.: US 11,475,880 B2
(45) Date of Patent: Oct. 18, 2022

(54) JOINT ENDPOINTING AND AUTOMATIC SPEECH RECOGNITION

(71) Applicant: Google LLC, Mountain View, CA (US)

(72) Inventors: Shuo-yiin Chang, Sunnyvale, CA (US); Rohit Prakash Prabhavalkar, Santa Clara, CA (US); Gabor Simko, Santa Clara, CA (US); Tara N. Sainath, Jersey City, NJ (US); Bo Li, Fremont, CA (US); Yangzhang He, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 99 days.

(21) Appl. No.: 16/809,403

(22) Filed: Mar. 4, 2020

(65) Prior Publication Data

US 2020/0335091 A1    Oct. 22, 2020

Related U.S. Application Data

(60) Provisional application No. 62/834,482, filed on Apr. 16, 2019.

(51) Int. Cl.
| | |
|---|---|
| *G10L 15/16* | (2006.01) |
| *G10L 15/02* | (2006.01) |
| *G10L 15/14* | (2006.01) |
| *G10L 15/28* | (2013.01) |
| *G10L 15/08* | (2006.01) |

(52) U.S. Cl.
CPC .............. *G10L 15/16* (2013.01); *G10L 15/02* (2013.01); *G10L 15/14* (2013.01); *G10L 15/28* (2013.01); *G10L 2015/025* (2013.01); *G10L 2015/088* (2013.01)

(58) Field of Classification Search
CPC ......... G10L 15/16; G10L 15/02; G10L 15/14; G10L 15/28; G10L 2015/025; G10L 2015/088; G10L 15/04; G10L 15/08; G10L 2015/221; G10L 15/22; G10L 15/005; G10L 15/26; G10L 15/063; G10L 15/07; G10L 15/18; G10L 15/05; G10L 15/144; G10L 15/148; G10L 2015/223; G10L 25/21; G10L 25/51
See application file for complete search history.

(56) References Cited

U.S. PATENT DOCUMENTS

| | | | |
|---|---|---|---|
| 7,668,718 B2 * | 2/2010 | Kahn .................... | G10L 15/063 704/270 |
| 9,437,186 B1 * | 9/2016 | Liu ......................... | G10L 15/05 |
| 9,953,661 B2 * | 4/2018 | Vickers ............... | G10L 21/0264 |
| 10,331,796 B1 * | 6/2019 | Waibel .................. | G06F 40/205 |

(Continued)

*Primary Examiner* — Abdelali Serrou
(74) *Attorney, Agent, or Firm* — Honigman LLP; Brett A. Krueger; Grant Griffith

(57) ABSTRACT

A method includes receiving audio data of an utterance and processing the audio data to obtain, as output from a speech recognition model configured to jointly perform speech decoding and endpointing of utterances: partial speech recognition results for the utterance; and an endpoint indication indicating when the utterance has ended. While processing the audio data, the method also includes detecting, based on the endpoint indication, the end of the utterance. In response to detecting the end of the utterance, the method also includes terminating the processing of any subsequent audio data received after the end of the utterance was detected.

26 Claims, 10 Drawing Sheets

(56) References Cited

U.S. PATENT DOCUMENTS

| | | | |
|---|---|---|---|
| 10,643,036 B2* | 5/2020 | Ahn | G10L 15/26 |
| 11,004,454 B1* | 5/2021 | Srinivasan | G10L 15/06 |
| 2007/0225982 A1* | 9/2007 | Washio | G10L 15/22 |
| | | | 704/257 |
| 2013/0060570 A1* | 3/2013 | Williams | G10L 15/063 |
| | | | 704/251 |
| 2015/0310879 A1* | 10/2015 | Buchanan | G10L 15/04 |
| | | | 704/235 |
| 2016/0379632 A1* | 12/2016 | Hoffmeister | G10L 25/87 |
| | | | 704/253 |
| 2018/0052831 A1* | 2/2018 | Ahn | G06F 40/51 |
| 2018/0130460 A1* | 5/2018 | Nagano | G06F 16/3329 |

* cited by examiner

0: speech, 1: intermediate silence, 2: initial silence, 3: final silence
(b) RNN-T + EOQ classifier (c) RNN-T joint decoding and endpointing (a) Histogram for EOQ endpointer latency.

(b) Histogram for E2E endpointer latency.

(c) Histogram for E2E EP +EOQ EP latency.

JOINT ENDPOINTING AND AUTOMATIC SPEECH RECOGNITION

CROSS REFERENCE TO RELATED APPLICATIONS

This U.S. patent application claims priority under 35 U.S.C. § 19(e) to U.S. Provisional Application 62/834,482, filed on Apr. 16, 2019. The disclosure of this prior application is considered pan of the disclosure of this application and is hereby incorporated by reference in its entirety.

TECHNICAL FIELD

This disclosure relates to joint endpointing and automatic speech recognition.

BACKGROUND

Natural language processing systems typically use endpointers to determine when a user has started and finished speaking an utterance. Some traditional endpointers evaluate the duration of pauses between words in determining when an utterance begins or ends. For instance, if a user says "what is <long pause> for dinner," a traditional endpointer may segment the voice input at the long pause, and instruct the natural language processing system to attempt to process the incomplete phrase "what is" instead of the complete phrase "what is for dinner." If an endpointer designates an incorrect beginning or endpointing for a voice input, the result of processing the voice input may be inaccurate or undesirable. Recognizing the end of a spoken utterance, or endpointing, is an important function of streaming automatic speech recognition (ASR) systems.

SUMMARY

Implementations herein are directed toward a speech recognition model that decodes the content of an utterance as well as determines the end of an utterance. For example, the speech recognition model can be a neural network model that jointly performs both speech decoding and speech endpointing. The model can be an end-to-end model, such as one that receives input data indicating audio characteristics of the utterance and outputs orthographic data (e.g., graphemes, wordpieces, or words) without using an external language model.

Jointly predicting an endpoint and speech content with a single model can provide a number of advantages. For example, due to the joint nature of the model, the model can make an endpointing decision based on both (i) the acoustic information for the utterance and (ii) the model's interpretation of semantic meaning or language content of the utterance. This can allow endpointing decisions that are faster and more accurate than models that evaluate audio characteristics alone. Additionally, jointly predicting both the endpoint and speech content can detect an endpoint much taster than systems that first determine a transcription and subsequently use a transcription to make an endpointing decision.

Generally, endpointing refers to the process of identifying an end of a spoken utterance, such as the end of a phrase, sentence, question, or request. Some endpointing techniques use a voice activity detector or end-of-query detector as an endpointer, which is typically a separate model or module operating alongside but separate from speech recognition models. Implementations herein are directed toward enhancing endpointing of an automated speech recognition (ASR) system by incorporating the endpointing functionality into a speech recognition model. Specifically, an end-to-end mode) can be used to jointly perform both speech recognition and endpointing. As will become apparent, employing an end-to-end model capable of jointly performing speech recognition and endpointing can significantly reduce delay/latency in detecting utterance endpoints, and in some cases, cutting the delay/latency of detecting endpoints in half.

Optionally, a joint speech recognition and endpointing model can also be used with another separate endpointing module to provide redundancy and reduce average latency. For example, the joint mode) may provide faster, more accurate endpointing results in many circumstances, but a dedicated endpointing model may provide better results in other circumstances. Using both techniques together can provide the best results across a broader range of situations. For example, the system can be configured so that an endpoint is set at the earliest signal from the two models. In other words, both models can evaluate audio in parallel, and whichever of the two models indicates an endpoint first will set the endpoint for the utterance.

One aspect of the disclosure provides a method of endpointing an utterance. The method includes receiving, at data processing hardware, audio data of an utterance spoken by a user of a user device, and processing, by the data processing hardware, the audio data to obtain, as output from a speech recognition model configured to jointly perform speech decoding and endpointing of utterances, partial speech recognition results for the utterance; and an endpoint indication indicating when the utterance has ended. While processing the audio data, the method also includes detecting, by the data processing hardware, based on the endpoint indication output from the speech recognition model, the end of the utterance. The method also includes, in response to detecting the end of the utterance, terminating by the data processing hardware, the processing of any subsequent audio data received after the end of the utterance was detected.

Implementations of the disclosure may include one or more of the following optional features. In some implementations, the method also includes, in response to detecting the end of the utterance, transmitting by the data processing hardware, a transcription of the utterance to a search engine or a digital conversational assistant system, the transcription based on the partial speech recognition results output, by the speech recognition model while processing the audio data. In some examples, the speech recognition model includes a streaming speech recognition model configured to emit the partial speech recognition results for the utterance before the endpointing decision indicates when the utterance has ended. For instance, the streaming speech recognition model may include a Recurrent Neural Network-Transducer (RNN-T). In these examples, the method also includes, prior to detecting the end of the utterance, providing, by the data processing hardware, for display on a screen in communication with the data processing hardware, any partial speech recognition results emitted by the speech recognition audio.

The data processing hardware may reside on the user device of the user and execute the speech recognition model. In some implementations, in response to detecting the end of the utterance, the method also includes deactivating, by the data processing hardware, an array of one or more microphones that captured the utterance spoken by the user.

The speech recognition model may include a neural network configured to generate, as output, a probability distribution over a set of output labels for each audio feature in the sequence of audio features. The output labels may include linguistic units and an utterance endpoint symbol. Here, the processing of the audio data to obtain the endpoint indication may include determining the speech recognition model has output the endpoint indication when the output label including the utterance endpoint symbol is associated with a probability score that satisfies a threshold score. Moreover, the linguistic units may include graphemes, wordpieces, or words. In some examples, the output labels further include at least one of: an utterance start symbol indicating the beginning of an utterance; a punctuation symbol indicating a punctuation element; a space symbol indicating a space character; or a blank symbol that does not correspond to any orthographic element.

In some examples, the speech recognition model is configured to output, based on the audio data for the utterance, a decoded sequence of symbols, and the processing of the audio data to obtain the endpoint indication includes determining whether an endpoint symbol corresponding to the endpoint indication is included in the decoded sequence of symbols output by the speech recognition model. In these examples, the determining whether the endpoint symbol corresponding to the endpoint indication is included in the decoded sequence of symbols output by the speech recognition model may include determining that a probability score associated with the endpoint symbol satisfies a threshold score. In additional examples, the processing of the audio data to obtain the endpoint indication indicating the end of the utterance includes determining, during a beam search process over multiple outputs of the speech recognition model, whether a symbol corresponding to the endpoint indication is included in one or more beams of the beam search process.

Another aspect of the disclosure provides a system including data processing hardware and memory hardware storing instructions that when executed on the data processing hardware cause the data processing hardware to perform operations that include receiving audio data of an utterance spoken by a user of a user device, and processing the audio data to obtain, as output from a speech recognition model configured to jointly perform speech decoding and endpointing of utterances: partial speech recognition results for the utterance; and an endpoint indication indicating when the utterance has ended. While processing the audio data, the operations also include detecting, based on the endpoint indication output from the speech recognition model, the end of the utterance. The operations also include, in response to detecting the end of the utterance, terminating the processing of any subsequent audio data received after the end of the utterance was detected.

This aspect may include one or more of the following optional features. In some implementations, the operations also include, in response to detecting the end of the utterance, transmitting a transcription of the utterance to a search engine or a digital conversational assistant system, the transcription based on the partial speech recognition results output by the speech recognition model while processing the audio data. In some examples, the speech recognition model includes a streaming speech recognition model configured to emit the partial speech recognition results for the utterance before the endpointing decision indicates when the utterance has ended. For instance, the streaming speech recognition model may include a Recurrent Neural Network-Transducer (RNN-T). In these examples, the operations also include, prior to detecting the end of the utterance, providing, for display on a screen in communication with the data processing hardware, any partial speech recognition results emitted by the speech recognition audio.

The data processing hardware may reside on the user device of the user and execute the speech recognition model. In some implementations, in response to detecting the end of the utterance, the operations also include deactivating an array of one or more microphones that captured the utterance spoken by the user. The speech recognition model may include a neural network configured to generate, as output, a probability distribution over a set of output labels for each audio feature in the sequence of audio features. The output labels may include linguistic units and an utterance endpoint symbol. Here, the processing of the audio data to obtain the endpoint indication may include determining the speech recognition model has output the endpoint indication when the output label including the utterance endpoint symbol is associated with a probability score that satisfies a threshold score. Moreover, the linguistic units may include graphemes, word pieces, or words. In some examples, the output labels further include at least one of: an utterance start symbol indicating the beginning of an utterance; a punctuation symbol indicating a punctuation element; a space symbol indicating a space character; or a blank symbol that does not correspond to any orthographic element.

In some examples, the speech recognition model is configured to output, based on the audio data for the utterance, a decoded sequence of symbols, and the processing of the audio data to obtain the endpoint indication includes determining whether an endpoint symbol corresponding to the endpoint indication is included in the decoded sequence of symbols output by the speech recognition model. In these examples, the determining whether the endpoint symbol corresponding to the endpoint indication is included in the decoded sequence of symbols output by the speech recognition model may include determining that a probability score associated with the endpoint symbol satisfies a threshold score. In additional examples, the processing of the audio data to obtain the endpoint indication indicating the end of the utterance includes determining, during a beam search process over multiple outputs of the speech recognition model, whether a symbol corresponding to the endpoint indication is included in one or more beams of the beam search process.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
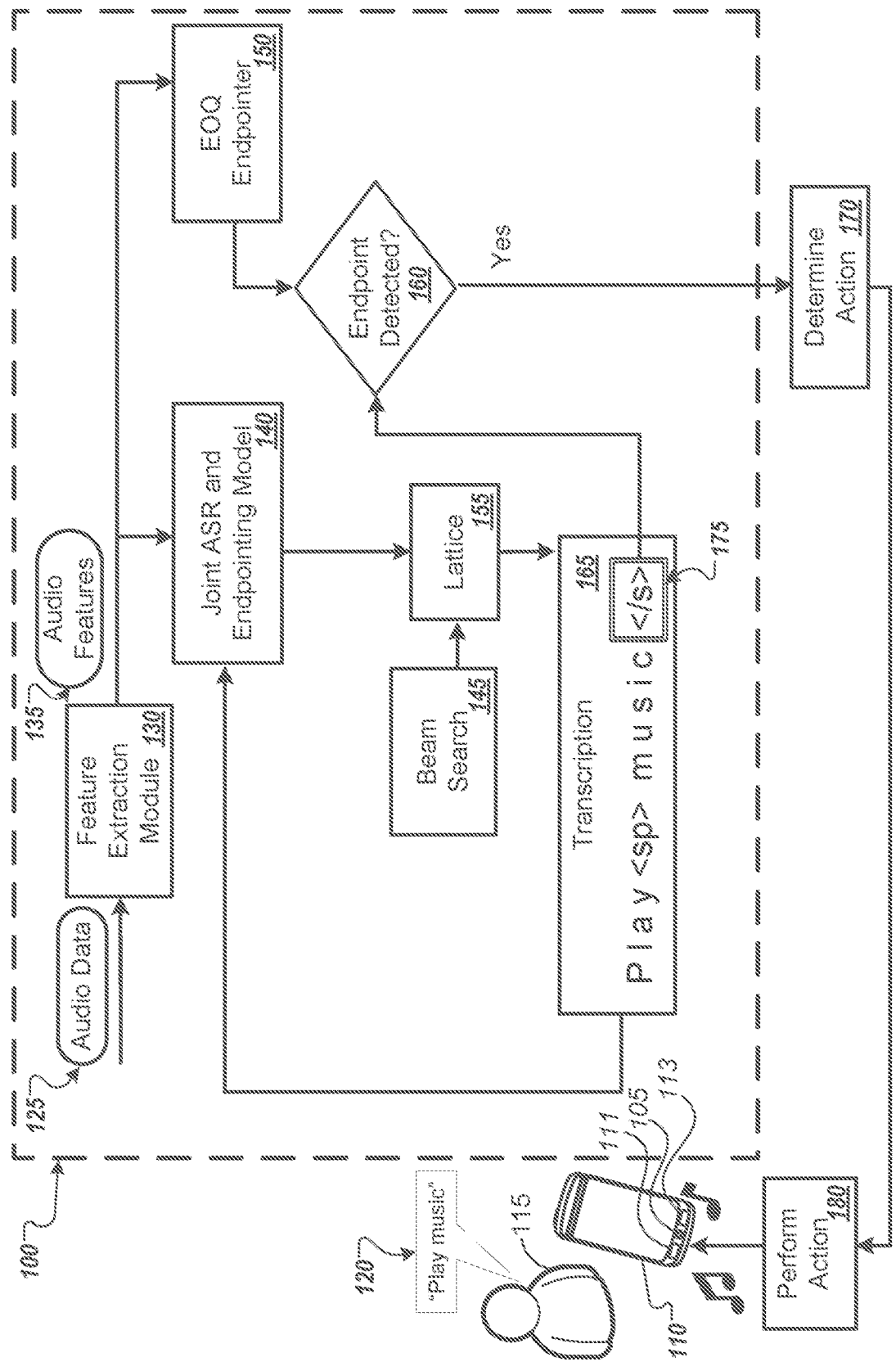
FIG. 1 is a schematic view of an example speech recognizer using a joint automated speech recognition (ASR) and endpointing model in conjunction with an end of query (EOQ) endpointer.

General purpose automatic speech recognition (ASR) systems can be configured to recognize the end of a spoken utterance, such as the end of a phrase, sentence, question, or request. Quickly and accurately determining that an utterance has ended is often important in order to provide accurate results with low-latency. For example, if an ASR system prematurely ends the capture and processing of audio, the end of the user's utterance may be cut off and the resulting transcription may be incomplete. On the other hand, if an ASR system continues to wait for additional audio after an utterance has ended, the system may unnecessarily delay providing a response to the user.

ASR systems can include an endpointer, a component of ASR systems that is responsible for determining when the user has finished speaking. The purpose of an endpointer is to ensure natural and fast voice interaction in streaming speech recognition applications such as voice assistant and voice search. It is desirable to close a microphone as soon as the user finishes speaking. This minimizes the delay of the system response, referred to as latency. However, it is also important to avoid cutting off utterances prematurely. The errors in endpointing can have drastic impact on user experience. If the system waits too long to close the microphone, the user experience feels slow. If the system is too aggressive, the user gets cut off while speaking. Thus, the tradeoff between transcription accuracy (e.g., as measured by word error rate (WER)) and latency, is very important for ASR applications. Thus it is desirable that an ASR system should endpoint and close the microphone or otherwise stop including further audio in the current utterance as quickly as possible after an utterance ends, without degrading recognition accuracy.

Some ASR systems have separate acoustic, pronunciation, and language model components. These ASR systems may rely on a separately trained endpointing module, which interacts with the individual components to identify the end of a spoken utterance.

One way to recognize the end of an utterance is to use a voice-activity detector (VAD) to classify each frame of an audio signal as either speech or silence, where silence is strictly non-speech. When using a VAD, the endpoint is set as soon as the system observes speech followed by a long silence interval. A VAD detects acoustic cues which distinguish present speech from present, silence, but ignores potential cues which may help to predict whether a current silence will be followed by subsequent speech. These potential acoustic cues can include filler sounds, speaking rhythm, or pitch to inform the decision of whether a human talker intends to continue speaking after a given pause. Therefore, a VAD can have long delays in the system response. Generally, VADs are better suited for endpointing long-form speech.

Another type of endpointer is a probabilistic end-of-query (EOQ) classifier, which is trained to directly predict whether or not the user has finished speaking at a given time. The EOQ classifier looks for speech, initial silence, intermediate silence, and final silence. The EOQ classifier can detect acoustic cues which help indicate whether the user intends to utter more speech. Additionally, whereas a VAD treats silences near the start and end of an utterance in the same way, the EOQ classifier treats them differently. In an EOQ classifier, the probability of endpointing grows over time throughout an utterance. An EOQ classifier makes endpointing decisions based solely on acoustic information, without considering information from the language model. The EOQ classifier is trained independently from the rest of the components of the ASR, such as the acoustic model, pronunciation model, and language model.

Some ASR systems use end-to-end models that fold the acoustic, pronunciation, and language models into a single end-to-end neural network, thus simplifying the recognition pipeline. An important requirement for many modern ASR systems is to allow streaming operation, e.g., concurrent determination and output of decoded speech while the speaker continues speaking. A streaming model emits decisions as the user is speaking, without waiting for the end of an utterance to decode speech content. A streaming model cannot wait until the end of the utterance to perform decoding. One type of streaming neural network mode) is a recurrent neural network transducer (RNN-T), which can use its internal memory to process a sequence of inputs. An RNN-T model is capable of emitting partial recognition results as audio signals are processed.

Endpointing can be enhanced using an end-to-end ASR model that incorporates the endpointer into the speech recognition neural network, so that the joint model can perform both speech recognition (e.g., decoding) and endpointing. This joint model can optionally also be paired with another separate endpointing module to provide redundancy and reduce average latency. The combined system triggers an endpointing decision using both a joint endpointing/speech recognition model and a dedicated endpointing model (e.g., an EOQ model or a VAD), setting the endpoint based on whichever of the two models triggers an endpoint first.

FIG. 1 illustrates an example speech recognizer 100 that uses a joint ASR and endpointing model 140 in conjunction with an EOQ endpointer 150. In the example shown, the speech recognizer 140 executed on data processing hardware 111 of a user device 110 to permit the user deivce 102 to capture an utterance 120 spoken by a user 102 and locally perform speech recognition and endpointing on the utterance 120. The user device 110 includes memory hardware 113 storing instructions, that when executed by the data processing hardware 111, cause the data processing hardware to perform operations that include, among other things, executing the speech recognizer 100. In other examples, some or all of the components of the speech recognizer 100 may reside on a remote computing device, e.g., one or more servers of a distributed system providing a cloud-computing environment). For instance, the joint ASR and endpoint model 140 may reside on one of the user device 110 or the remote computing device and the EOQ endpointer 150 may reside on the other one of the user device 110 or the remote computing device. As such, the joint speech recognition and endpointing techniques can be used by a client device or server system in an arrangement where the client device and server system exchange information to complete speech processing.

The speech recognizer 100 includes a feature extraction module 130 configured to receive audio data 125 encoding the utterance 120 and generate audio features 135 indicating acoustic characteristics of the audio data 125. The audio features 135 are input to the joint ASR and endpointing model ("joint model") 140 as well as to the EOQ endpointer 150. Output of the joint model 140 is evaluated using a beam search process 145 or another process. For example, the recognizer may execute the beam search process 145 on a speech lattice 155 obtained from outputs of the joint model 140 to produce a transcription 165 for the utterance 120 encoded in the audio data 125. The speech recognizer 100 may trigger endpoint detection 160 responsive to receiving an endpoint signal from either one of the joint model 140 or the EOQ endpointer 150, whichever occurs first. The endpoint signal corresponds to an endpoint indication output by the joint model 140 or the EOQ endpointer 150 that indicates an end of an utterance 120. In some examples, the endpoint indication (e.g., endpoint signal) may include an endpoint token 175 in the transcription 165 selected by the beam search 145. Once the speech recognizer 100 triggers endpoint detection 160, the user device 110 can end detection of the utterance 120, e.g., by stopping the processing of further audio using the joint model 140 or in some implementations disabling input from an array of microphone(s) 105 to at least some portions of the system 100. For instance, the speech recognizer 100 may provide an instruction to deactivate the microphone(s) 105, also known as a microphone closing event. The endpoint signal can also trigger the device 110 to perform another action 170, such as to initiate a response to the utterance 120 by requesting or providing search results, carrying out a command, and so on.

In the example shown, the user 115 speaks an utterance 120 associated with command to the user device 110. The array of one or more microphones 105 of the user device 110 (in some examples one or more of the microphones in the array may be remote from the user device 110 and in communication with the data processing hardware 111) obtains the audio data 125 for the utterance 120 and the feature extraction module 130 extracts the audio features 135 corresponding to acoustic characteristics of the utterance 120 for input to the joint model 140. Here, the joint model 140 may continuously receive and process audio features 135 in an ongoing manner to perform streaming speech recognition. This process may begin with the detection of a wake word or hotword that triggers speech recognition processing.

As part of the speech recognition process, the feature extraction module 130 processes the audio data 125 by identifying audio features 135 representing the acoustic characteristics of the audio data 125. For example, the feature extraction module 130 produces audio feature vectors for different time windows of audio, often referred to as frames. The series of feature vectors can then serve as input to various models. The audio feature vectors contain information on the characteristics of the audio data 125, such as mel-frequency ceptral coefficients (MFCCs). The audio features may indicate any of various factors, such as the pitch, loudness, frequency, and energy of audio. The audio features 135 are provided as input the joint model 140, a recurrent neural network model such as RNN-T in the example, and to the EOQ endpointer 150. In some implementations, the feature vectors can be provided sequentially, one by one to the models 140, 150.

The neural network-based joint model 140 evaluates the audio features 135 to calculate ASR scores. The ASR scores indicate the likelihood that various linguistic units have occurred. For example, the model can output scores over a distribution of output labels that includes orthographic elements (e.g., graphemes, wordpieces, or words), with the scores in the distribution representing probabilities that the corresponding orthographic units represent the words were spoken.

It is not possible to evaluate all possible word sequences when transcribing speech. Thus, once the ASR scores are calculated, the recognizer 100 executes the beam search process 145 that includes pruning to guide the search to the most promising symbol paths. In other words, the beam search process 145 can limit the computation involved by using a limited number of active beams to search for the most likely sequence of words spoken. Other related processes such as lattice pruning can be used to reduce the size of the lattice 155 obtained from the outputs of the joint model 150. As the joint model determines a set of outputs (e.g., output labels) for each of a plurality of output steps, the beam search process 145 can prune away unlikely search paths and maintain only the most probable paths. Often, this can include maintaining only a limited number of search beams.

In some implementations, the RNN-T joint model 140 generates output scores for each set of output labels the RNN-T joint model 140 produces and one of the output labels in each set of output labels includes a special endpoint token</s> 175 for use in predicting endpointing decisions. The endpoint token 175 corresponds to an endpoint indication included as part of the expected output label sequence generated/predicted by the model 140 in order to indicate the end of the utterance. As discussed in more detail below, the joint model 140 can signal that an endpoint for the utterance has been reached by assigning a high probability score to the endpoint token 175. For example, when the probability score from the joint model 140 for the endpoint token 175 satisfies a threshold score and/or when the beam search process 145 includes the endpoint token 175 in a transcription, the recognizer 100 can detect that the end of the utterance has been reached. In particular, the endpointing decision 160 indicating whether or not the endpoint has been reached can be made when, during the beam search process 145, a top-scoring beam contains the endpoint token</s> 175. In this manner, the joint model 140 acts jointly as a speech decoder and an endpointer, with the endpointing decision 160 being based on the output of the end-of-sentence token</s> 175.

The system may also operate the endpointer 150 in parallel with the joint model 140. Before the endpoint is determined, both models 140, 150 can receive new feature vectors 135 extracted by the feature extraction module 130 from additional audio data 125 as the audio data 125 is received/detected. The endpointer 150 evaluates the audio features 135 to predict whether or not the user has finished speaking at a given time. The endpointer 150 can be of the EOQ type that can detect acoustic cues which help indicate whether the user intends to utter more speech. The endpointer 150 can make endpointing decisions based solely on acoustic information, without considering information from a language model or any other speech recognition model.

The speech recognizer 100 can make the endpointing decision 160 using both the EOQ endpointer 150 and the joint model 140. The endpoint is triggered based on whichever model 140, 150 first signals an endpoint indication indicating that an endpoint of the utterance has been reached. In most cases, the joint model 140 endpoints first, since the endpointing is performed in conjunction with decoding in the joint model 140, which allows for more semantically-aware interpretation of the meaning of acoustic data. However, there may be instances when the joint model 140 fails to output an endpoint indication. This could be due to anomalies in the user's speech, such as an incomplete phrase or atypical word choice, where the semantic meaning of detected speech may incorrectly suggest that further speech will be forthcoming. In these instances, the EOQ endpointer 150 provides redundancy to trigger endpointing based on acoustic data (e.g., a significant pause or silence) even if the joint mode) 140 does not yet determine an endpoint.

When an endpoint is detected, whether due to output of the EOQ endpointer 150 or the joint model 140, the device 110 ends detection of the utterance. This may involve one or more actions to reduce or stop listening for or processing further speech. Similarly, it may involve stopping the provision of audio data to the joint model 140 (or any other speech recognition model) or to a remote system, such as a server system. In some implementations, the device 110 terminates the speech recognition process, although the device 110 may continue to use a keyword spotting model to detect certain keywords, such as hotwords or wake words. In response to detecting the endpoint, the device 110 can initiate obtaining and providing a response to the utterance, such as sending a transcription to a search engine or digital conversational assistant. In addition, in response to detecting the endpoint, the current utterance can be ended, with further speech being considered part of a new, separate utterance.

In the example of FIG. 1, the recognizer produces a transcription 165 of the utterance. The user device 110 may then determine an action 170 from the transcription 165 and perform the action 180 in response to the spoken command 120. For example, if the transcription 165 is "Play music," the user device 110 may determine that the transcription 165 represents a command, and the device 110 can begin to play music from a music app on the mobile device 110.

Of course, transcriptions generated in this manner can be used in many different ways, in addition to or instead of determining a voice command. For example, the transcription 165 may be provided for display on a screen of the device 110, provided to an application on the device 110, provided to a server system over a network, included in a request to a search engine or other system, included in a dictated message or document, and so on. Detection of the endpoint can trigger any of these actions, as well as others such as re-scoring with an additional speech recognition model (e.g., a language model) or other processing. Moreover, the recognizer 100 may produce a partial transcription 165 from partial speech recognition results (e.g., graphemes, wordpieces, or words) output by the RNN-T joint model 140 while the audio data 125 is being received and before detecting the end of the utterance. Here, the recognizer 100 may display the partial transcription 165 on the screen of the user device 115 (or another device) in a streaming fashion while the user 115 is still speaking.

In the example of FIG. 1, the speech recognizer 100 (e.g., ASR system) is shown in a manner that is self-contained on the mobile device 110, with the speech recognition model 140 and additional endpointing model 150 being stored on the memory hardware 113 and executed locally on the data processing hardware 111 of the device 110. In this arrangement, the device 110 may be able to provide speech recognition functionality without the need for a connection to a network. Nevertheless, the same modeling techniques can be used to perform endpointing by a remote device or when processing is shared among multiple devices. For example, a server system that processes audio data received over a network can use a joint endpointing and speech recognition mode) 140 to similarly reduce latency in providing responses.

Figure 2:
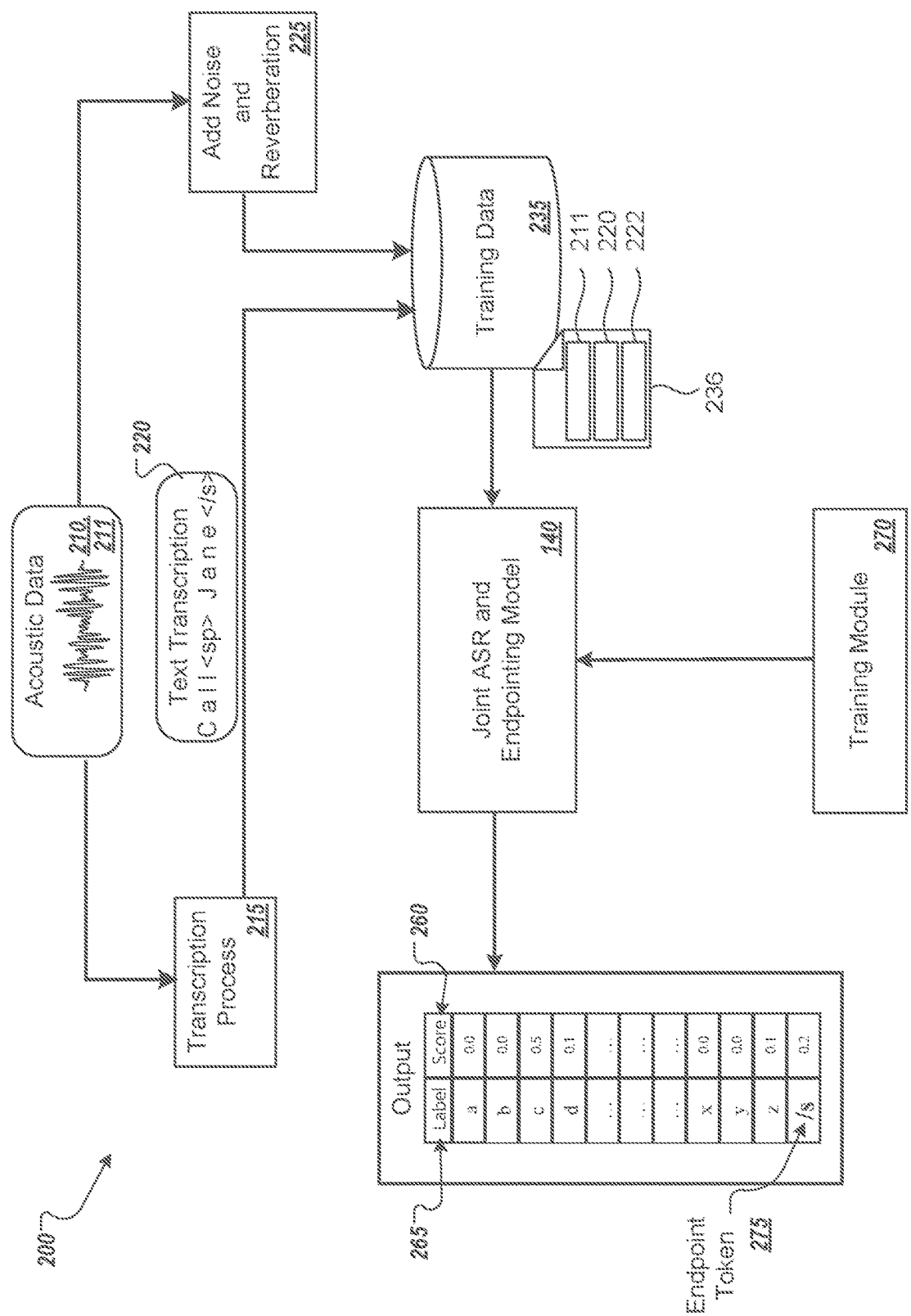
FIG. 2 is a schematic view of an example training process for training the joint ASR and endpointing model of FIG. 1 to jointly perform speech decoding and endpointing of utterances.

FIG. 2 illustrates an example training process 200 for training the joint model 140 to jointly perform speech decoding and endpointing of utterances. The training process 200 trains the joint ASR and endpointing model 140 on training data 235 including a plurality of training samples 236 that each include a training utterance 220, a corresponding transcription 220 for the training utterance 220, and a sequence of reference output labels 222 for the corresponding transcription 220. The training process 200 may generate the training data 235 by collecting acoustic data 210 from spoken utterances. In some cases, thousands, hundreds of thousands, or millions of utterances are collected and used. An example training sample 236 may include 20 million English utterances 211 (over 10,000 hours). The training utterances 211 are anonymized and transcribed by a transcription process 215 to produce the corresponding text transcriptions 220. The transcription process 215 may be performed by a trained speech recognition system or manually by a human. To improve robustness in real-world conditions, the training utterances 220 in at least a portion of the training samples 236 can be artificially corrupted by adding varying degrees of noise and reverberation 225 using a room simulator. In one example, a set of training examples may have training utterances 220 with differing overall signal-to-noise ratios (SNR) between 0 dB and 30 dBt with an average SNR of 12 dB. As a result, each training sample 236 can include audio data for the training utterance 211, the corresponding reference transcription 220, and a sequence of reference output labels 222.

During the training process 200, a training module 270 adjusts parameters of the joint model 140. For instance, the training module 270 may feed feature vectors associated with one training utterance 211 at time as input to the joint model 140 and the joint model 140 may generate/predict, as output, different sets of output scores 260. The individual output scores 260 each correspond to different output labels in an output label set 265. The output label set 265 includes linguistic units, graphemes in the example, as well as an endpoint token</s> 275. The output scores 260 respectively represent the relatively likelihood of the corresponding symbol should be added to the decoded sequence representing the utterance. Additional types of output labels can be used, such as output labels for a space character, for punctuation marks, and for a "blank" output label that does not represent the addition of any orthographic (e.g., written) element to a decoded label sequence. The training module 270 is configured to compare the predicted output labels 265 and associated output scores 260 with the reference output labels 222 for the corresponding reference transcription 211 and adjust parameters of the joint model 140, e.g., neural network weights, to improve the accuracy of the predictions. The training to improve prediction accuracy for the endpoint token</s> 275 can be done jointly with and at the same time as training for output labels for linguistic units. This process of adjusting the model parameters can repeat for many different training samples 236 to train the joint model 140 to make accurate predictions for both speech decoding and endpointing.

Referring back to FIG. 1, the endpointer 150 is a component of the speech recognizer that is responsible for determining when the user has finished speaking. The purpose of an endpointer is to ensure natural and fast voice interaction in streaming speech recognition applications such as voice assistant and voice search. It is desirable to close the microphone as soon as the user finishes speaking. This minimizes the latency or delay of the system response. However, it is also important to avoid cutting off users while they are still speaking. The errors in endpointing can have drastic impact on user experience. If the system waits too long to close the microphone, the user experience feels slow. If the system is too aggressive, the user gets cut off while speaking. Thus, the tradeoff between transcription accuracy, as measured by word error rate (WER), and latency is very important for ASR applications. The system should endpoint and close the microphone as quickly as possible after an utterance, without degrading WER.

Some ASR systems have separate acoustic, pronunciation, and language model components. These ASR systems may rely on a separately trained endpointing module, which interacts with the individual components to identify the end of a spoken utterance.

One way to recognize the end of an utterance is to use a VAD to classify each frame of an audio signal as either speech or silence. In a VAD, the microphone closes as soon as the system observes speech followed by a long silence interval. A VAD detects the acoustic cues which distinguish present speech from present silence, but ignores potential cues which may help to predict whether a current silence will be followed by subsequent speech. These potential acoustic cues can include filler sounds, speaking rhythm, or fundamental frequency to inform the decision of whether a human talker intends to continue speaking after a given pause. Therefore, this method can cause long delays in the system response.

A probabilistic end-of-query (EOQ) classifier is trained to directly predict whether or not the user has finished speaking at a given time. The EOQ classifier looks for speech, initial silence, intermediate silence, and final silence. The EOQ classifier can detect acoustic cues which help indicate whether the user intends to utter more speech. Additionally, whereas a VAD treats silences near the start and end of an utterance in the same way, the EOQ classifier treats them differently. In an EOQ classifier, the probability of endpointing grows over time throughout an utterance. An EOQ classifier makes endpointing decisions based solely on acoustic information, without considering information from the language model. The EOQ classifier is trained independently from the rest of the components of the ASR, such as the acoustic model, pronunciation model, and language model.

Figure 3A:
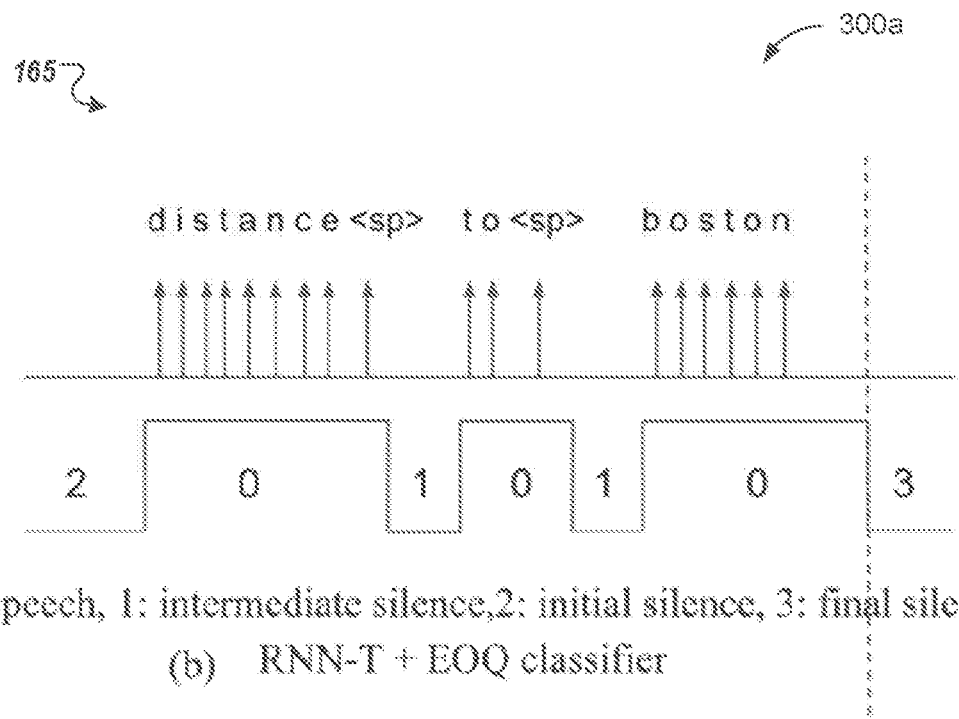
FIG. 3A shows a plot of a sequence of end-of-query (EOQ) classification labels predicted by an endpointer module.

FIG. 3A shows a plot 300a of a sequence of end of query (EOQ) detection labels output by an EOQ classifier for an utterance 120 represented by a sequence of audio features 135. The plot 300a also shows a corresponding transcription 165 for the utterance 110. The EOQ detection labels include speech ("0"), initial silence ("3"), intermediate silence ("2"), and final silence ("3"). The symbol<sp> in the sequence output labels denotes a space. The frame-wise posteriors of final silence are thresholded to obtain a hard microphone closing decision. The EOQ classifier has shown around 100 ms latency improvement over VAD based endpointer at the same WER.

Both the VAD and EOQ classifiers make endpointing decisions based solely on acoustic information, while ignoring information from the language model. Additionally, these classifiers are trained independently from the rest of the components of the ASR pipeline, namely the acoustic model, pronunciation model and language model. By training an end-to-end model to do decoding and endpointing jointly, improvements can be made over VAD and EOQ classifiers.

Figure 3B:
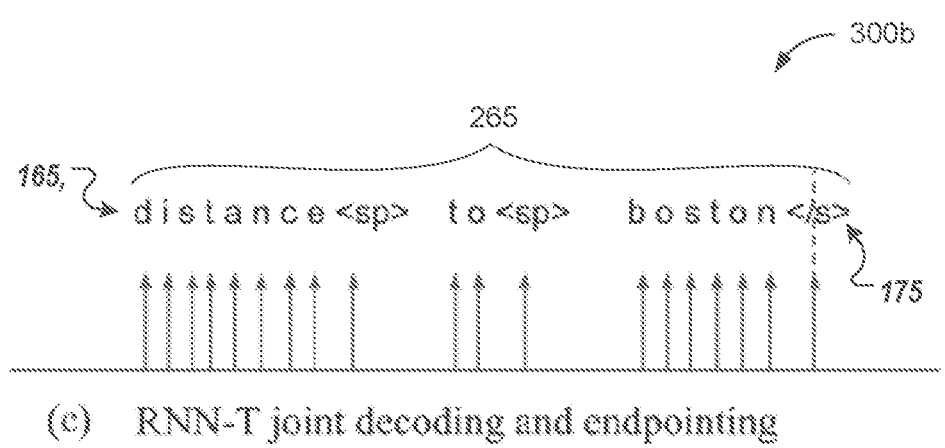
FIG. 3B shows a plot of a sequence of decoded output labels including an endpoint token output by the joint ASR and endpointing model of FIG. 1.

FIG. 3B shows a plot 300b of a sequence of decoded output labels 265 output by the RNN-T joint model 140. In order to enable joint decoding and endpointing with an RNN-T model, the RNN-T model is trained with the end-of-sentence (e.g., endpoint) token</s>175. Here, the beam search process 145 terminates when</s> is output, whereby the endpoint token</s>175 correspond to the endpoint indication indicating the end of the utterance 120. This folds endpointing jointly into the end-to-end model, minimizing the dependence on an external VAD or EOQ classifiers.

Figure 4:
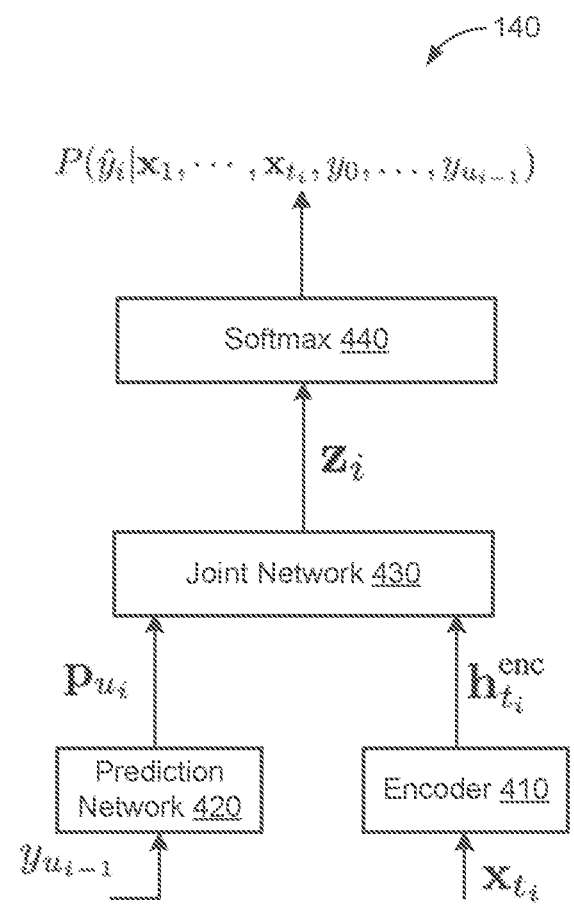
FIG. 4 shows an example architecture of a Recurrent Neural Network-Transducer (RNN-T) model.

FIG. 4 illustrates the architecture for an RNN-T of the joint model 400 in the architecture, the encoder 410 is analogous to an acoustic model that receives acoustic feature vectors $x_t \in \mathbb{R}^d$, while the prediction network 420 acts as a language model that accepts the previous grapheme label prediction $y_{u-1}$ as input, and computes an output vector $p_u$. For each combination of acoustic frame input t and label u, the encoder 410 outputs $h_t$ and the prediction outputs $p_u$ are passed to a joint network 430 to compute output logits n fed in a softmax layer 440 which defines a probability distribution over the set of output targets. Hence, the RNN-T is often described as an end-to-end model because it can be configured to directly output graphemes directly without the aid of an additional external language model.

The conditional probability distribution for RNN-T can be expressed as:

$$P(y \mid x) = \sum_{\hat{y} \in A(x,y)} \prod_{t=1}^{T} P(\hat{y}_t \mid x_1, \ldots, x_i, y_0, y_1, \ldots, y_u(t-1))$$

where $x_i$ is a feature vector, which is 80-dimensional log-Mel filterbank features for each frame 1 . . . T. The ground-truth label sequence of length U is denoted as $y_1$, $y_2, \ldots, y_u$ where $y_u \in S$ (S is the set of grapheme symbols). A special symbol $y_0$=<sos> indicates the start of the sequence. For the convenience of formulation, S is augmented with an additional blank symbol<b>, and the set of all possible alignments is described as follow: $\hat{y}=\hat{y}_1 \ldots \hat{y}_r \in A(x, y)$, where $A(x, y)$ represents all label sequences $\hat{y} \in \{S \cup (b)\}^T$ such that $\hat{y}$ is equal to y when<b> is removed. With this notation in place, the conditional probability of labeling given the acoustics P(y|x) is obtained by simply summing over the alignments.

The probability of seeing some label in an alignment $\hat{y}_t$ is conditioned on the acoustic features up to time t and the history of non-blank labels, $y_1, \ldots y_{u(t-1)}$, emitted so far. The only independence assumption made is that the probability of a partial alignment $\hat{y}_{1 \ldots t}$ up to time t does not depend on acoustic features from future frames. This enables inference in a streaming fashion, alleviating; the need to wait for all of the audio before beginning the computation. This not only speeds up execution, but also produces recognition results as the audio is being processed, which enables joint endpointing.

To expand RNN-T with endpointing decisions, a special symbol</s> indicates the end of the utterance as part of the expected label sequence. In some examples, the RNN-T model 140 makes the microphone closing decision when a top-beam contains</s>. Therefore, the model acts jointly as a decoder and an endpointer.

Mis-prediction of </s> could account for much larger impact on quality than other symbols especially if </s> prediction is too early. Hence, the posterior of </s> is precisely controlled in two different aspects when performing beam-search for decoding.

First, the </s> label is penalized with a positive scale α as shown below:

$$P((/s)|x_1, \ldots, x_t, y_0, \ldots, y_{u(t-1)})^\alpha \geq \beta$$

By controlling α, the posterior of </s> that competes with other symbols is directly modified. If α is set greater than 1, extra penalty is added to </s>. In this case, the hypothesis including</s> has higher cost than the others in the search beam, so it is less likely to present on top. Since declaring an endpointing decision relies on top hypothesis, the modification makes the endpointing decision less aggressive. On the contrary, using smaller α makes endpointing more aggressive and could hurt WER by introducing deletion errors.

Second, the search space with </s> is expanded only if the modified posterior is above a predefined threshold β to further reduce early endpointing. The endpoint token</s> is added to the search beam only if the following condition is met:

$$P(\langle/s\rangle|x_1, \ldots, x_t, y_0, \ldots, y_{u(t-1)})^\alpha \geq \beta$$

Sweeping α allows the </s> symbol to be discarded or allowed when expanding the hypotheses during the search. Hence β determines if the </s> symbol is allowed to present in the search beam, while α affects the ordering for the hypothesis with </s>.

Figure 5:
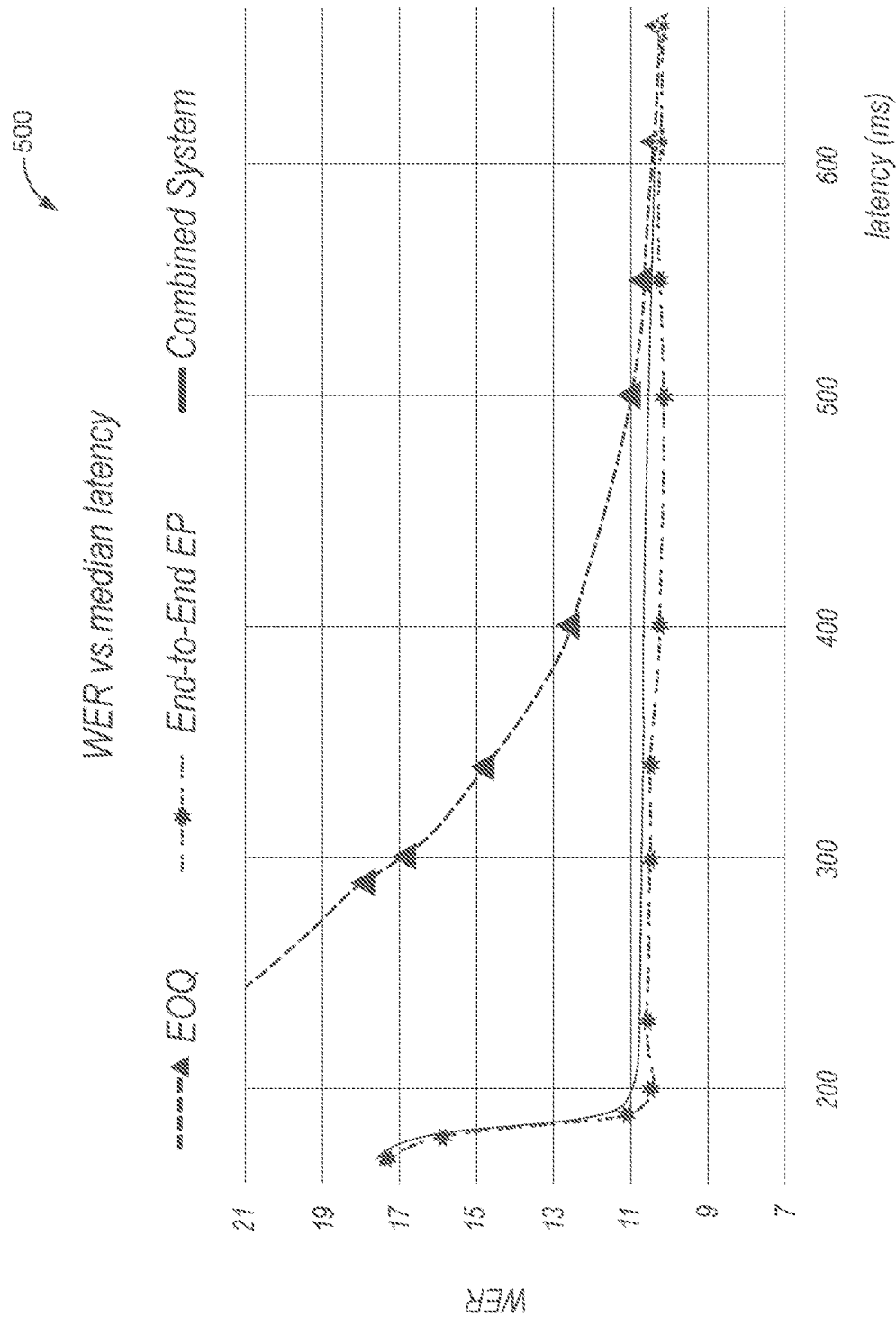
FIG. 5 is a plot of depicting word error rate (WER) versus median latency for an EOQ classifier, and end-to-end endpointer, and a combined system of an EOQ endpointer and an end-to-end endpointer.

FIG. 5 shows an example plot 500 depicting experimental results of WER, vs. latency for (a) an EOQ, (b) an end-to-end endpointer, and (c) an implementation of a combined system that triggers an endpointing decision using both FOQ and end-to-end endpointer, based on which system triggers first. The goal of endpointing is to find the best tradeoff between fast endpointing, as measured by latency, and accuracy, as measured by wER. An aggressive endpointer may provide a faster response at the expense of hurting WERs, while a passive endpointer may improve. WER but increase latency The following is a specific example of an RNN-T model that can be used for joint decoding and endpointing, though many other configurations can be used effectively. An example RNN-T model uses 80-dimensional log-Mel features with a frame step of 10 ms computed using a 25 ms window. These features are stacked with 3 frames to the left and downsampled to a 30 ms frame rate. The encoder network architecture consists of 8 long short-term memory (LSTMs), where each inner has 2048 hidden units followed by a 640-dimensional projection layer. The decoder is 2 LSTM layers with 2,000 hidden units and a 640-dimensional projection per layer. To stabilize training, a layer-norm layer is input after each LSTM layer in the encoder and decoder. The encoder and decoder are fed to a joint-network that has 640 hidden units. The joint network is fed to a softmax layer, with a total of 76 grapheme units. The example RNN-model is trained on 8×8 Tensor Processing Unit (TPU) slices with a global batch size of 4,096.

The following is an example of an EOQ detector that can be used for endpointing. An example EOQ input acoustic feature vector sequence consists of 40-dimensional log mel filterbanks with an upper limit of 4 kHz and a frame step of 10 ms using a 25 ms window. The example EOQ classifier uses a convolutional, LSTM, deep neural network (DNN), which is a combination of convolutional, stacked LSTM and DNN layers. The features are passed into a frequency convolutional layer with a filter width of 8 frequency bands and pooling with stride 3, followed by a 64-node ReLU DNN layer, a sequence of two 64-cell LSTM layers, another 64-node ReLU DNN layer, and a 4-node softmax layer.

For an end-to-end endpointer, the tradeoff for endpointing speed and transcription accuracy can be managed by sweeping the scale α and the threshold β. A larger α means adding a larger penalty to the endpoint, symbol</s>, which makes endpointing slower but also avoids deletions. Similarly, using larger β avoids expanding the availability of the endpoint symbol</s> in the search space, making the endpointing decision less aggressive. Both parameters are swept jointly to find best operating point Example values for α and β are α=2.0 and β=0.65.

In the example plot 500 of FIG. 5, the combined system is dominated by the end-to-end endpointer since it is much faster than EOQ endpointer. The end-to-end endpointer reduces median latency from 500 ms to 200 ms (60% relative improvement). However, while end-to-end endpointer is better than EOQ for both latency and WER, it shows around 10% endpointing coverage loss. This indicates that when the end-to-end endpointer decides to endpoint, it endpoints very quickly with much lower latency than the EOQ endpointer. However, for a subset of utterances, an end-to-end endpointer has a chance of not endpointing at all. On the other hand, the combined system compensates for this coverage loss with the aid of an EOQ system while still provide fast endpointing decisions from the end-to-end endpointer for the majority of the utterances. The combined system shows a 270 ms improvement (54% relative improvement) from the combined system without WER or endpointing coverage degradation comparing to EOQ baseline. In the combined system, the end-to-end endpointer is the major endpointer that declares decision for 82% of the utterances while EOQ endpointer covers the reset of 16% of the utterances. Hence, the combined system can maintain both the high coverage from the EOQ endpointer and the low latency from the end-to-end endpointer.

Figure 6A:
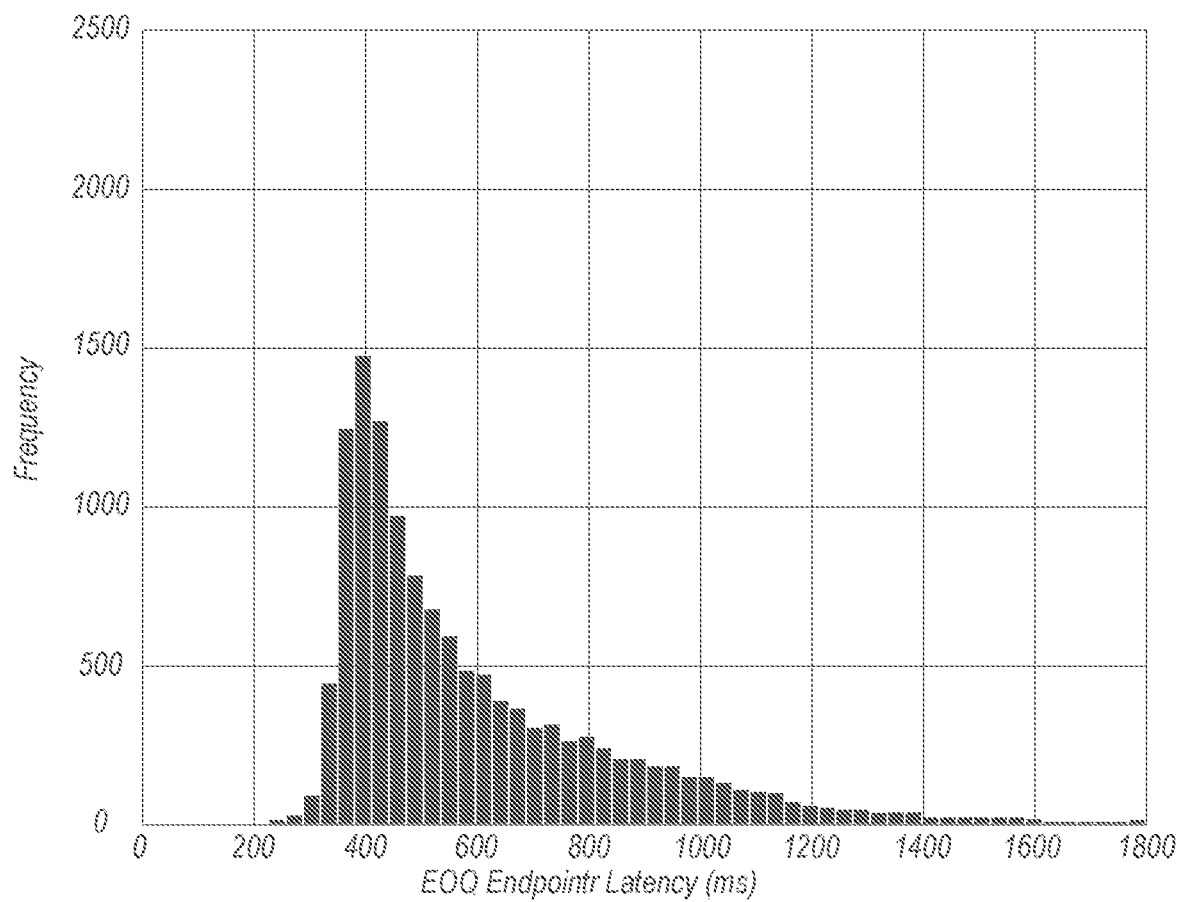
FIG. 6A is a histogram depicting latency for an EOQ endpointer.
Figure 6B:
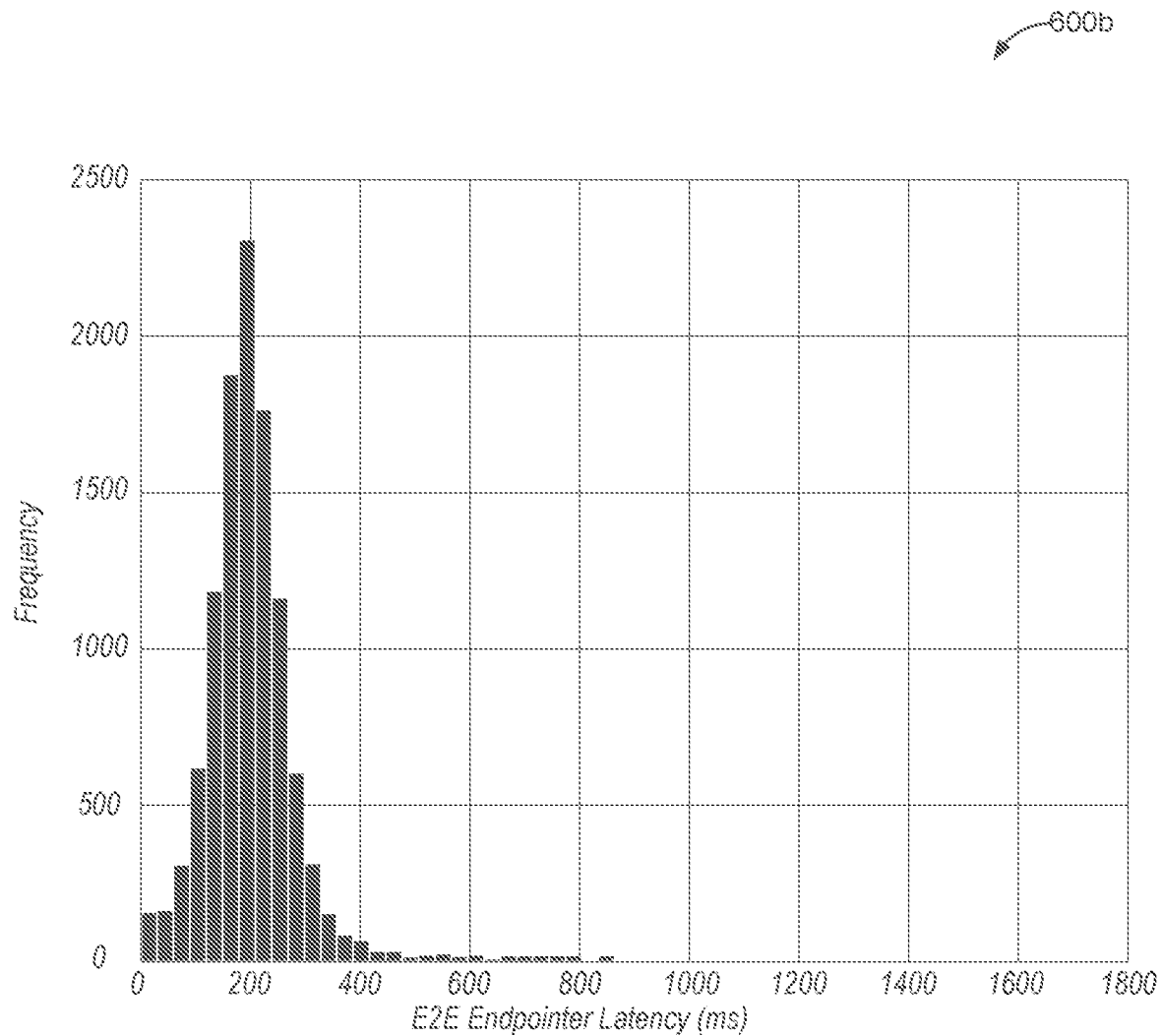
FIG. 6B is a histogram depicting latency for an end-to-end endpointer.
Figure 6C:
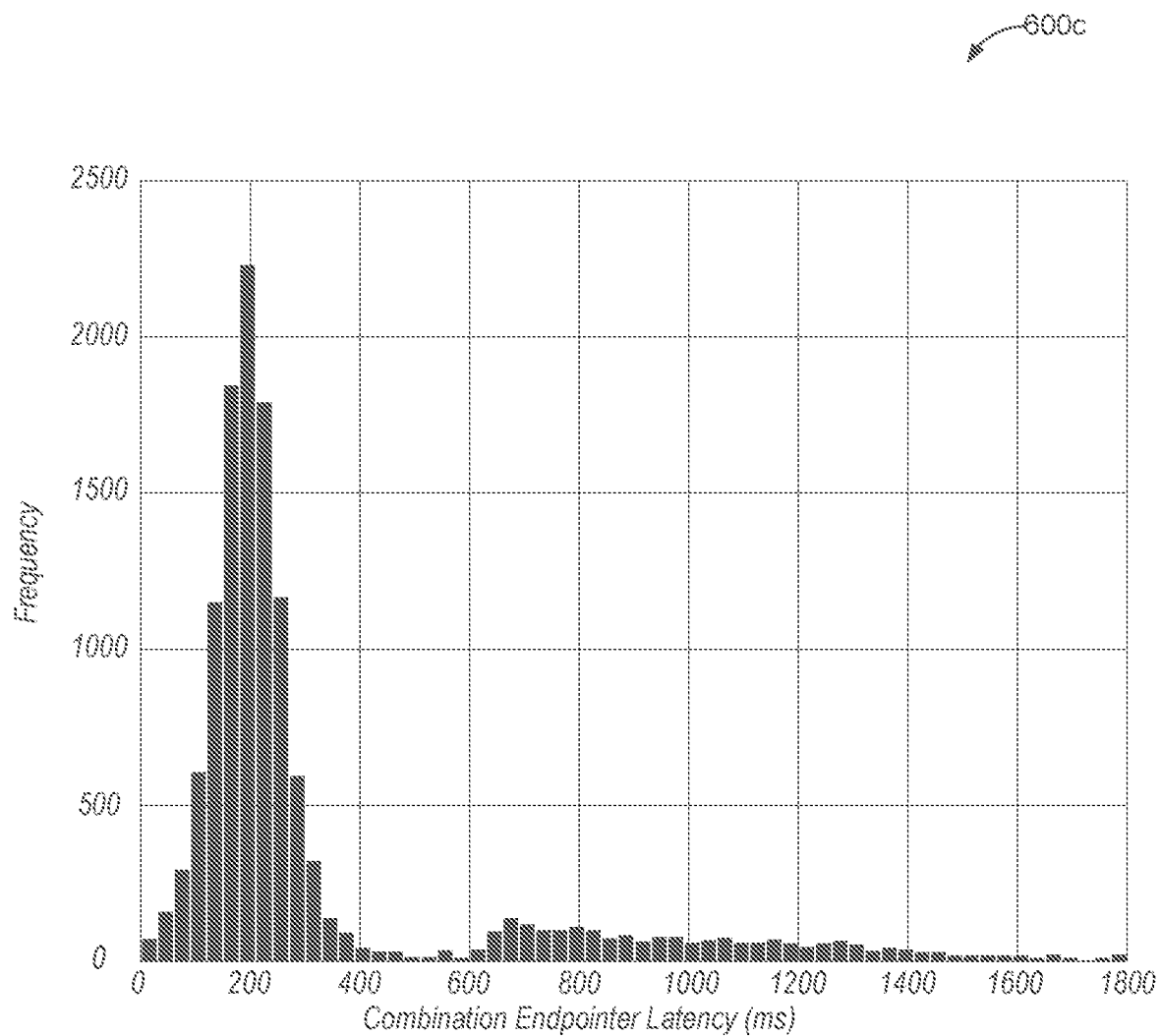
FIG. 6C is a histogram depicting latency for a combined system of an EOQ endpointer and an end-to-end endpointer.
Figure 7:
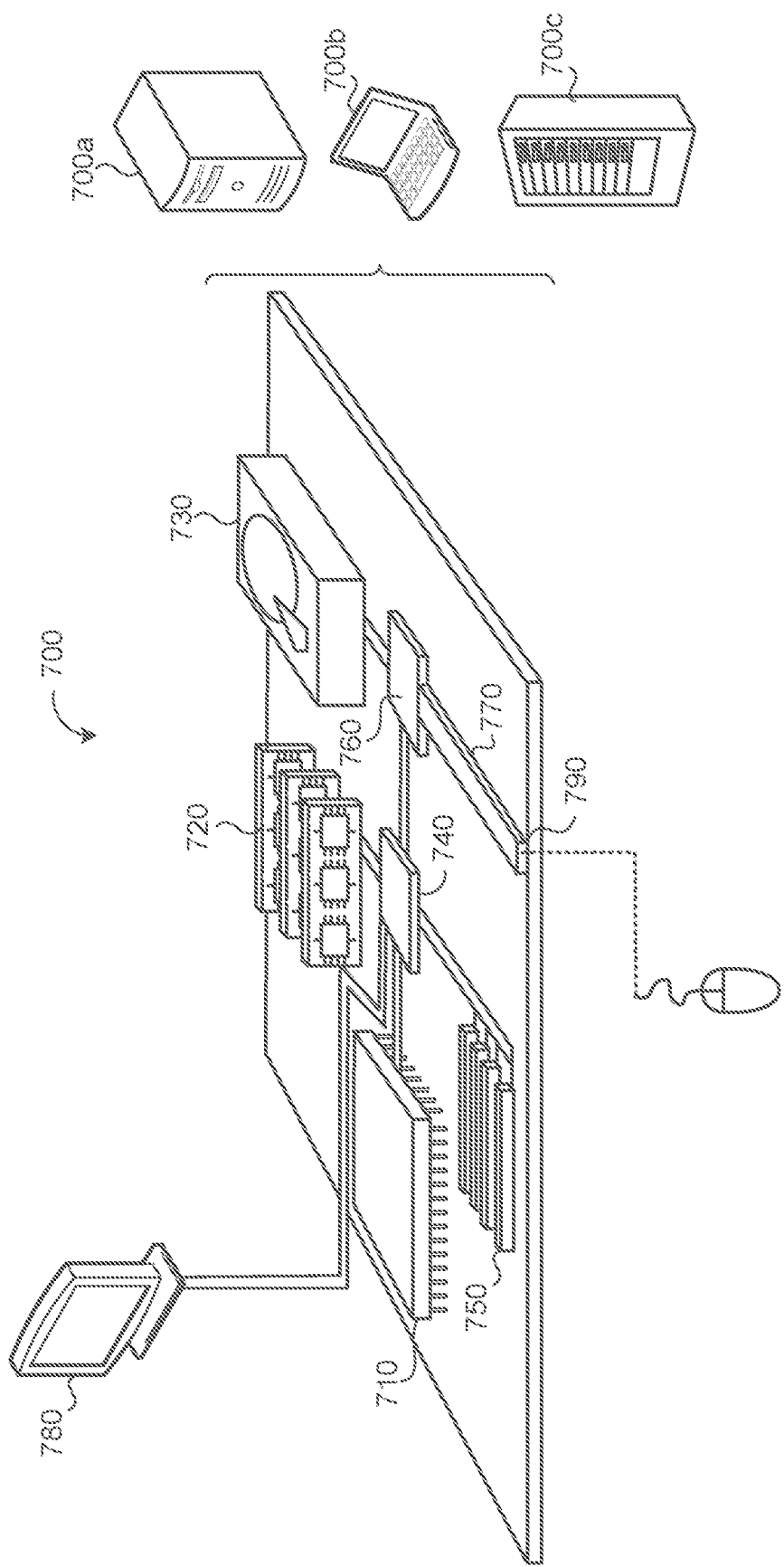
FIG. 7 is a schematic view of an example computing device that may be used to implement the systems and methods described herein.

FIGS. 6A-6C illustrate a series of histograms 600a-c demonstrating the experimental results comparing latency of an EOQ endpointer (FIG. 6A), an end-to-end endpointer (FIG. 6B), and a combined system (FIG. 6C) that triggers an endpointing decision using both EOQ and end-to-end endpointer, based on which system triggers an endpoint first FIG. 6A shows the histogram 600a for the EOQ endpointer latency on the utterances that have been actually endpointed. Only very few utterances have endpointer latency lower than 300 ms. The latency is mainly distributed between 300 ms and 1400 ms.

FIG. 6B shows a similar histogram 600b but for the end-to-end endpointer latency. In this case, almost all latency is between 0 and 400 ms. FIG. 6C shows the histogram 600c for the end-to-end plus EOQ endpointer. The majority of the utterances are still within 400 ms latency by end-to-end endpointer so the system acts quickly. The long tail in histogram 600c is expected, since the EOQ handles a small amount of corner cases with the latency distributed from 600 ms to 1400 ms.

. shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units, in some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), BMS (Enhanced Messaging Service), or MMS messaging (Multimedia Messaging Service). CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant or other similar mobile device.

Figure 8:
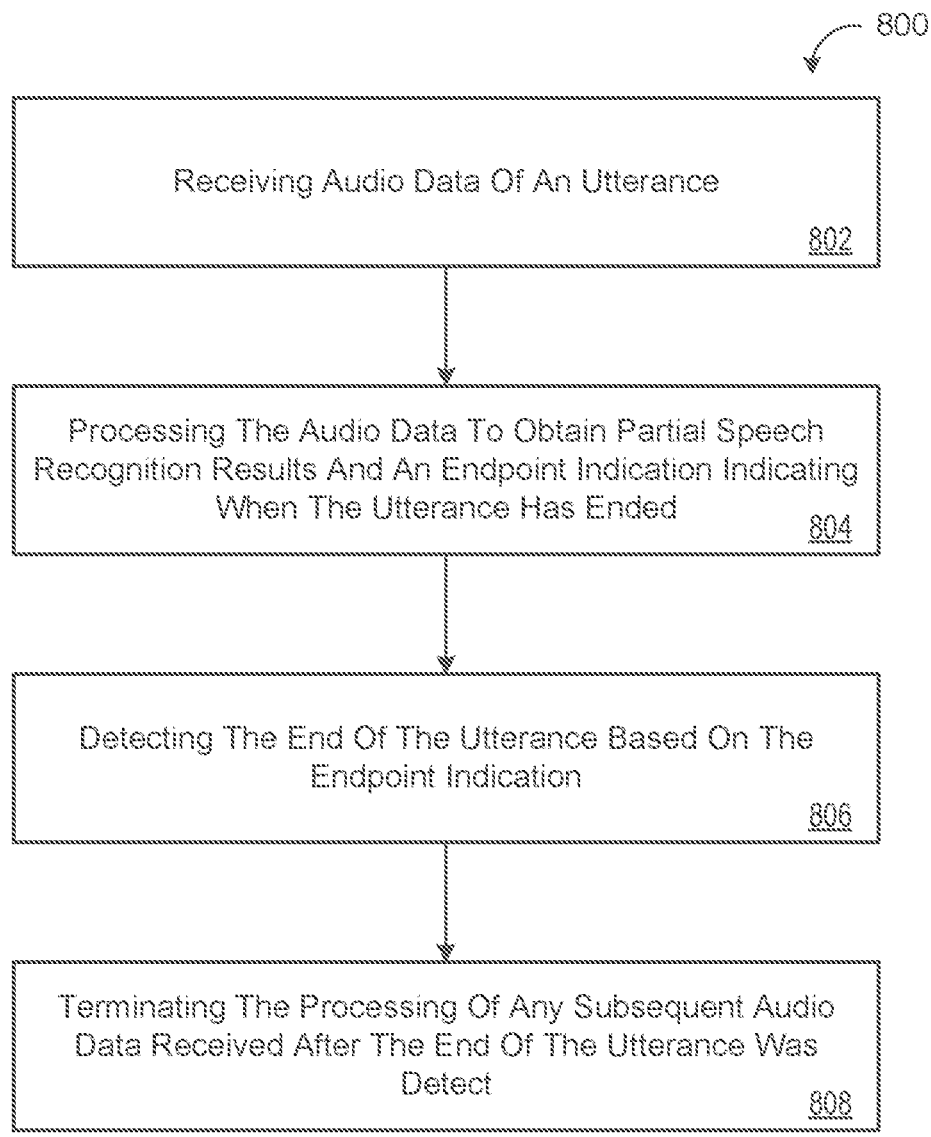
FIG. 8 is a flowchart of an example arrangement of operations for a method of endpointing an utterance using a speech recognition model.

FIG. 8 is a flowchart of an example arrangement of operations for a method 800 of endpointing an utterance. At operation 802, the method 800 includes receiving, at data processing hardware 111, audio data 125 of an utterance 120 spoken by a user 115 of a user device 110. At operation 804, the method 800 includes processing, by the data processing hardware 111, the audio data 125 to obtain, as output from a speech recognition model 140 configured to jointly perform speech decoding and endpointing of utterances: partial speech recognition results 165 for the utterance; and an endpoint indication 175 indicating when the utterance has ended. While processing the audio data 125, the method 800 includes, at operation 806, detecting, by the data processing hardware 111, based on the endpoint indication 175 output from the speech recognition model 140, the end of the utterance 120. At operation 808, the method 800 also includes, in response to detecting the end of the utterance 120, terminating, by the data processing hardware 111, the processing of any subsequent audio data 125 received after the end of the utterance 120 was detected.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g, typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g, internal hard disks or removable disks; magneto optical disks, and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data of an utterance spoken by a user of a user device;
   processing, by the data processing hardware, the audio data to obtain, as output from a single speech recognition model configured to jointly perform speech decoding and endpointing of utterances:
   a decoded sequence of output labels;
   partial speech recognition results for the utterance based on one or more linguistic units included in the decoded sequence of output labels; and
   an endpoint indication indicating when the utterance has ended by determining that an utterance endpoint symbol corresponding to the endpoint indication is included in the decoded sequence of output labels;
   in response to the endpoint indication output from the speech recognition model while processing the audio data, detecting, by the data processing hardware, the end of the utterance; and
   in response to detecting the end of the utterance, terminating, by the data processing hardware, the processing of any subsequent audio data received after the end of the utterance was detected.

2. The method of claim 1, further comprising, in response to detecting the end of the utterance, transmitting, by the data processing hardware, a transcription of the utterance to a search engine or a digital conversational assistant system, the transcription based on the partial speech recognition results output by the speech recognition model while processing the audio data.

3. The method of claim 1, wherein the speech recognition model comprises a streaming speech recognition model configured to emit the partial speech recognition results for the utterance before the endpointing decision indicates when the utterance has ended.

4. The method of claim 3, further comprising, prior to detecting the end of the utterance, providing, by the data processing hardware, for display on a screen in communication with the data processing hardware, any partial speech recognition results emitted by the speech recognition audio.

5. The method of claim 3, wherein the speech recognition model comprises a Recurrent Neural Network-Transducer (RNN-T).

6. The method of claim 1, wherein the data processing hardware resides on the user device of the user and executes the speech recognition model.

7. The method of claim 1, further comprising, in response to detecting the end of the utterance, deactivating, by the data processing hardware, an array of one or more microphones that captured the utterance spoken by the user.

8. The method of claim 1, wherein the speech recognition model comprises a neural network configured to generate, as output, a probability distribution over a set of output labels for each audio feature in a sequence of audio features representing acoustic characteristics of the audio data, the output labels comprising the linguistic units and the utterance endpoint symbol.

9. The method of claim 8, wherein processing the audio data to obtain the endpoint indication comprises determining the speech recognition model has output the endpoint indication when the output label comprising the utterance endpoint symbol is associated with a probability score that satisfies a threshold score.

10. The method of claim 8, wherein the linguistic units comprise graphemes, wordpieces, or words.

11. The method of claim 8, wherein the output labels further comprise at least one of:
    an utterance start symbol indicating a beginning of an utterance;
    a punctuation symbol indicating a punctuation element;
    a space symbol indicating a space character; or
    a blank symbol that does not correspond to any orthographic element.

12. The method of claim 1, wherein determining the utterance endpoint symbol corresponding to the endpoint indication is included in the decoded sequence of output labels output by the speech recognition model comprises determining that a probability score associated with the utterance endpoint symbol satisfies a threshold score.

13. The method of claim 1, wherein processing the audio data to obtain the endpoint indication indicating the end of the utterance comprises determining, during a beam search process over multiple outputs of the speech recognition model, whether the utterance endpoint symbol corresponding to the endpoint indication is included in one or more beams of the beam search process.

14. A system comprising:
data processing hardware; and
memory hardware in communication with the data processing hardware, the memory hardware storing instructions that when executed on the data processing hardware cause the data processing hardware to perform operations comprising:
receiving audio data of an utterance spoken by a user of a user device;
processing the audio data to obtain, as output from a single speech recognition model configured to jointly perform speech decoding and endpointing of utterances:
a decoded sequence of output labels;
partial speech recognition results for the utterance based on one or more linguistic units included in the decoded sequence of output labels; and
an endpoint indication indicating when the utterance has ended by determining that an utterance endpoint symbol corresponding to the endpoint indication is included in the decoded sequence of output labels;
in response to the endpoint indication output from the speech recognition model while processing the audio data, detecting the end of the utterance; and
in response to detecting the end of the utterance, terminating the processing of any subsequent audio data received after the end of the utterance was detected.

15. The system of claim 14, wherein the operations further comprise, in response to detecting the end of the utterance, transmitting a transcription of the utterance to a search engine or a digital conversational assistant system, the transcription based on the partial speech recognition results output by the speech recognition model while processing the audio data.

16. The system of claim 14, wherein the speech recognition model comprises a streaming speech recognition model configured to emit the partial speech recognition results for the utterance before the endpointing decision indicates when the utterance has ended.

17. The system of claim 16, wherein the operations further comprise, prior to detecting the end of the utterance, providing, for display on a screen in communication with the data processing hardware, any partial speech recognition results emitted by the speech recognition audio.

18. The system of claim 16, wherein the speech recognition model comprises a Recurrent Neural Network-Transducer (RNN-T).

19. The system of claim 14, wherein the data processing hardware resides on the user device of the user and executes the speech recognition model.

20. The system of claim 14, wherein the operations further comprise, in response to detecting the end of the utterance, deactivating an array of one or more microphones that captured the utterance spoken by the user.

21. The system of claim 14, wherein the speech recognition model comprises a neural network configured to generate, as output, a probability distribution over a set of output labels for each audio feature in a sequence of audio features representing acoustic characteristics of the audio data, the output labels comprising the linguistic units and the utterance endpoint symbol.

22. The system of claim 21, wherein processing the audio data to obtain the endpoint indication comprises determining the speech recognition model has output the endpoint indication when the output label comprising the utterance endpoint symbol is associated with a probability score that satisfies a threshold score.

23. The system of claim 21, wherein the linguistic units comprise graphemes, wordpieces, or words.

24. The system of claim 21, wherein the output labels further comprise at least one of:
an utterance start symbol indicating a beginning of an utterance;
a punctuation symbol indicating a punctuation element;
a space symbol indicating a space character; or
a blank symbol that does not correspond to any orthographic element.

25. The system of claim 14, wherein determining the utterance endpoint symbol corresponding to the endpoint indication is included in the decoded sequence of output labels output by the speech recognition model comprises determining that a probability score associated with the utterance endpoint symbol satisfies a threshold score.

26. The system of claim 14, wherein processing the audio data to obtain the endpoint indication indicating the end of the utterance comprises determining, during a beam search process over multiple outputs of the speech recognition model, whether the utterance endpoint symbol corresponding to the endpoint indication is included in one or more beams of the beam search process.

* * * * *